United States Patent
Cain et al.

(10) Patent No.: US 10,511,885 B2
(45) Date of Patent: Dec. 17, 2019

(54) REINFORCED INTERLEAVED WATERMARKING

(71) Applicant: Synamedia Limited, Middlesex (GB)

(72) Inventors: Harel Cain, Jerusalem (IL); Michal Devir, Haifa (IL); David Wachtfogel, Jerusalem (IL); Yaron Sella, Beit Nekofa (IL)

(73) Assignee: Synamedia Limited, Middlesex (GB)

( * ) Notice: Subject to any disclaimer, the term of this patent is extended or adjusted under 35 U.S.C. 154(b) by 356 days.

(21) Appl. No.: 15/390,502

(22) Filed: Dec. 25, 2016

(65) Prior Publication Data
US 2018/0184160 A1    Jun. 28, 2018

(51) Int. Cl.
| | |
|---|---|
| H04N 21/44 | (2011.01) |
| H04N 21/8358 | (2011.01) |
| H04N 21/8352 | (2011.01) |
| H04N 21/434 | (2011.01) |
| H04N 21/84 | (2011.01) |
| H04N 21/435 | (2011.01) |
| H04N 21/4385 | (2011.01) |
| H04N 21/4405 | (2011.01) |

(52) U.S. Cl.
CPC ... *H04N 21/44016* (2013.01); *H04N 21/4348* (2013.01); *H04N 21/4353* (2013.01); *H04N 21/43856* (2013.01); *H04N 21/4405* (2013.01); *H04N 21/8352* (2013.01); *H04N 21/8358* (2013.01); *H04N 21/84* (2013.01)

(58) Field of Classification Search
CPC ......... H04N 21/44016; H04N 21/8358; H04N 21/8352; H04N 21/4348; H04N 21/4405; H04N 21/84; H04N 21/4353; H04N 21/43856; H04N 21/435

USPC .......................................................... 380/255
See application file for complete search history.

(56) References Cited

U.S. PATENT DOCUMENTS

| | | |
|---|---|---|
| 7,823,174 B2 | 10/2010 | Candelore et al. |
| 8,300,881 B2 | 10/2012 | Chen et al. |
| 8,611,531 B2 | 12/2013 | Joseph et al. |

(Continued)

OTHER PUBLICATIONS

Zeng, Chunnian et al.; An Interleaving-Decomposition Based Digital Watermarking Scheme in Wavelet Domain; 2006 8th international Conference on Signal Processing, Beijing, 2006, pp. doi: 10.1109/ICOSP.2006.345977.

*Primary Examiner* — Kambiz Zand
*Assistant Examiner* — Benjamin A Kaplan
(74) *Attorney, Agent, or Firm* — Merchant & Gould P.C.

(57) ABSTRACT

In one embodiment, an apparatus includes a processor to receive a primary video, select first sections of the primary video in which to include units of data for use in watermarking, select second sections of the primary video, each second section including a first data item without which at least one video unit of the primary video cannot be rendered or rendered correctly, replace each first section with at least two watermark variants, replace each second section with at least two watermark variant decoys, wherein the apparatus is operative to operate in an environment including an end-user device operative to select one of the watermark variants for each first section and one of the watermark variant decoys for each second section for rendering as part of an interleaved video stream including the primary video in order to embed units of data of an identification in the interleaved video stream.

20 Claims, 6 Drawing Sheets

(56) References Cited

U.S. PATENT DOCUMENTS

| | | | |
|---|---|---|---|
| 8,964,119 B2 | 2/2015 | Sagliocco et al. | |
| 9,208,334 B2 | 12/2015 | Zhao | |
| 2004/0125952 A1* | 7/2004 | Alattar | G06T 1/0064 |
| | | | 380/202 |
| 2008/0301456 A1 | 12/2008 | Staring et al. | |
| 2010/0128871 A1 | 5/2010 | Folea et al. | |
| 2011/0280434 A1 | 11/2011 | Mamidwar et al. | |
| 2013/0191644 A1* | 7/2013 | Horne | G06F 21/16 |
| | | | 713/176 |

* cited by examiner

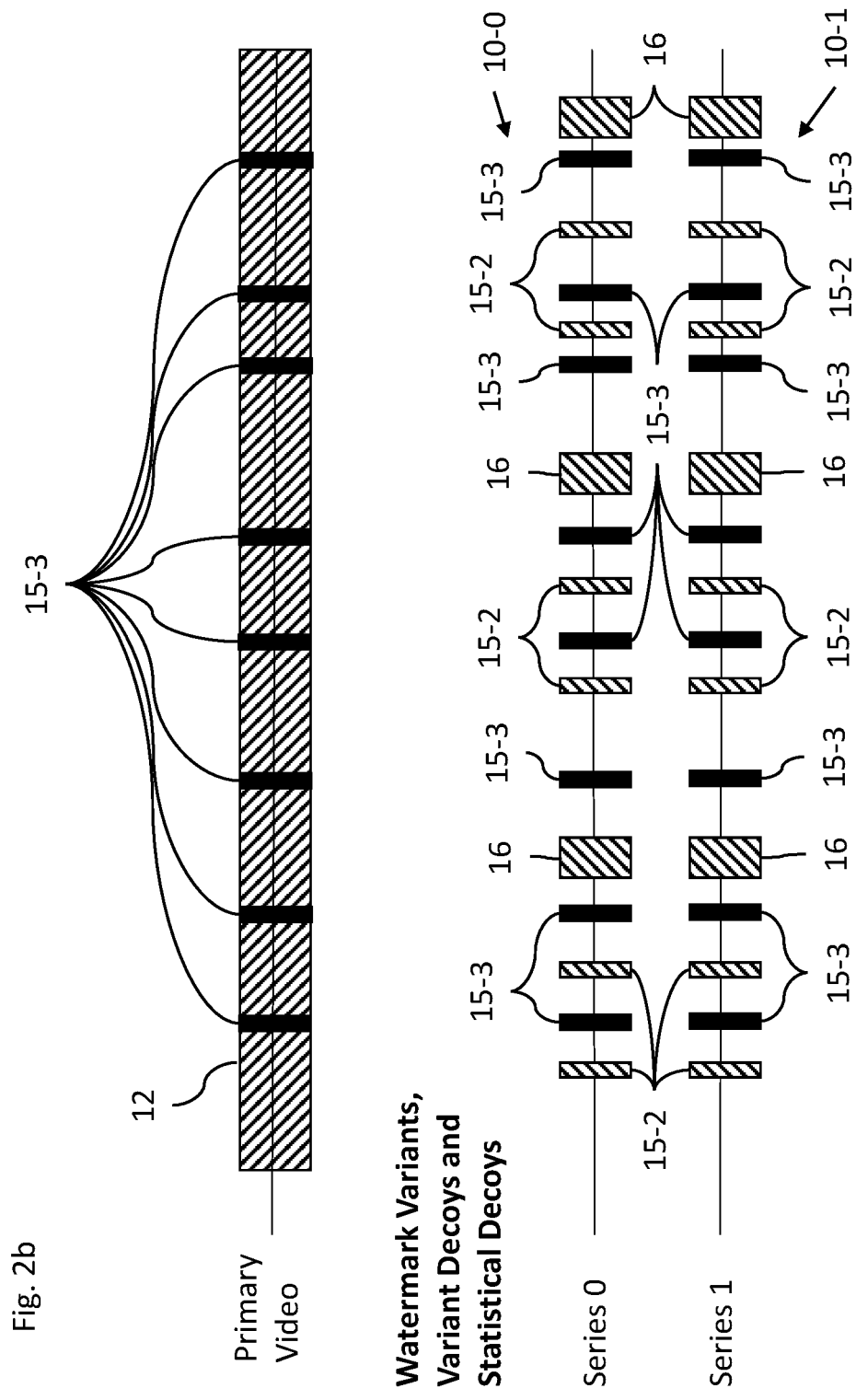

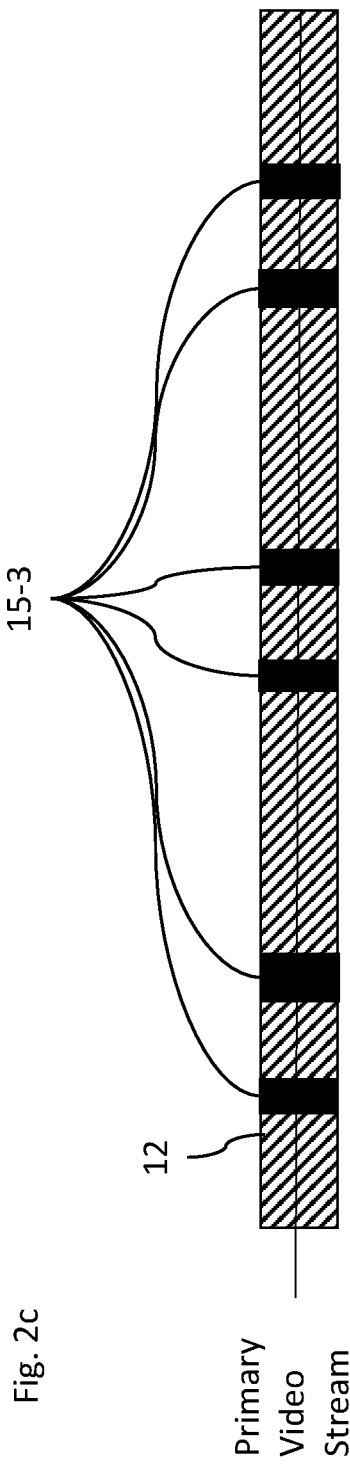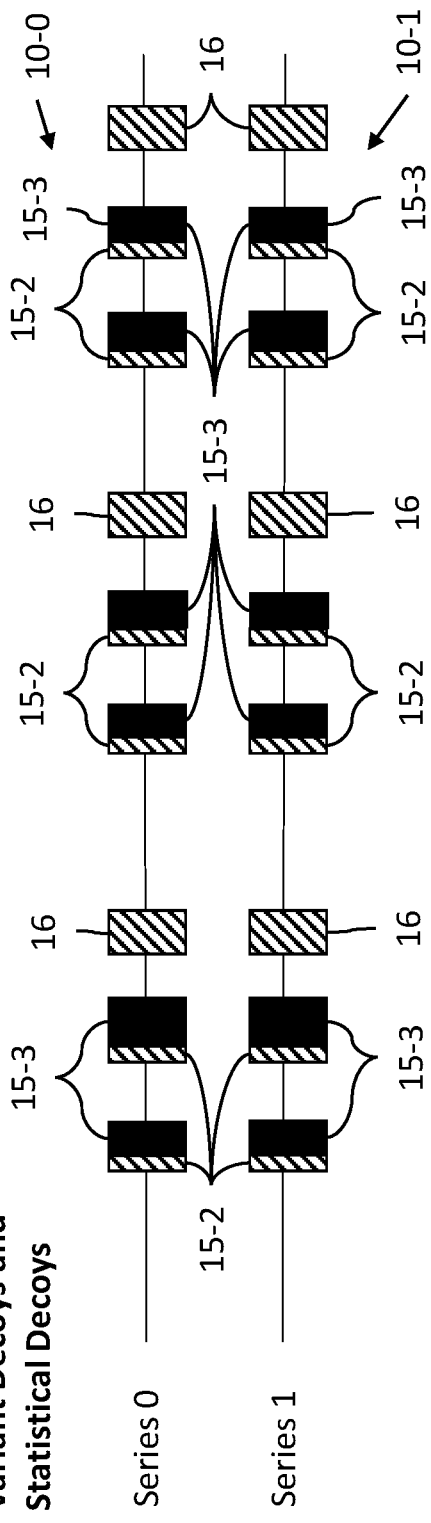

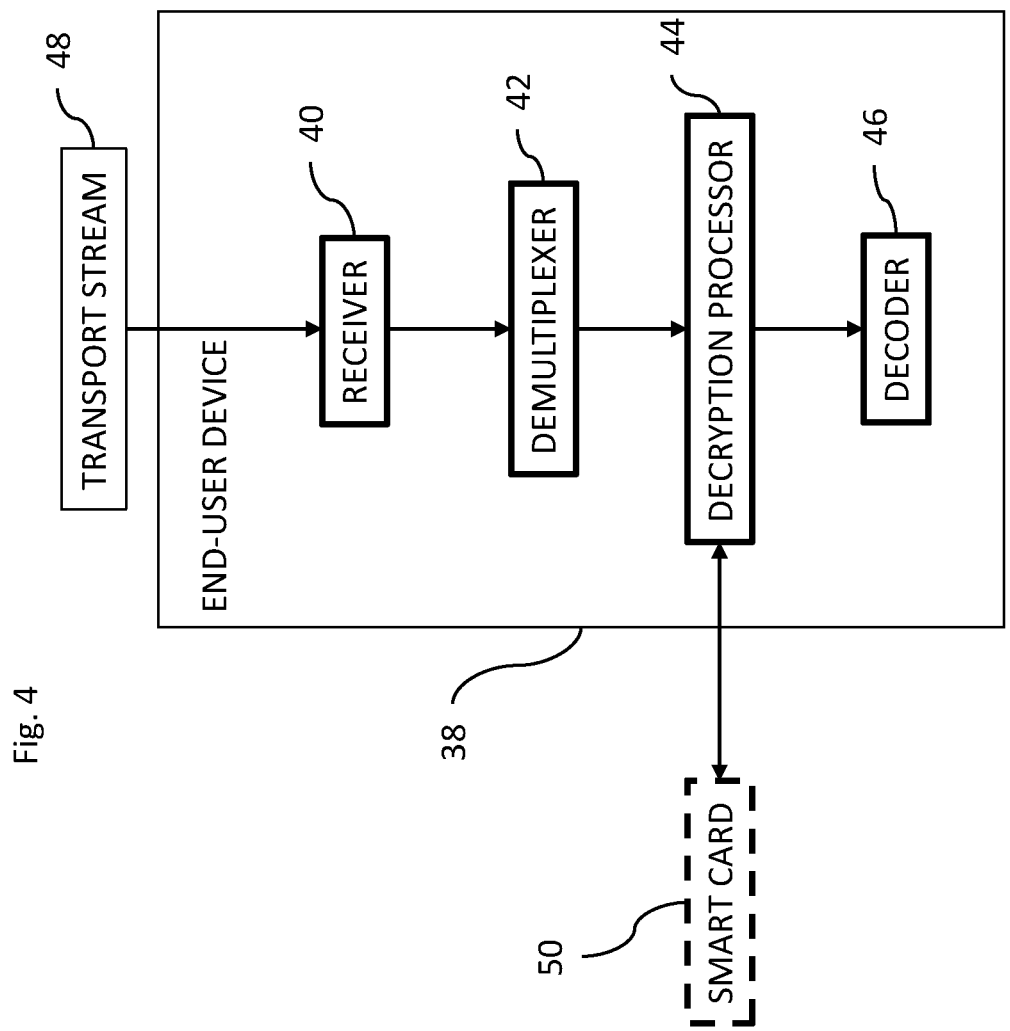

US 10,511,885 B2

REINFORCED INTERLEAVED WATERMARKING

TECHNICAL FIELD

The present disclosure generally relates to interleaved watermarking.

BACKGROUND

Interleave-based broadcast video watermarks are watermarks whose payload uniquely identifies an end-user device and/or a subscriber potentially illegally streaming content over the internet. The watermarks are inserted into selectable video data at the broadcast headend to achieve a higher level of security. The video data arriving at the end-user devices may be selectively rendered in order to embed suitable watermark data in a resulting composite video.

BRIEF DESCRIPTION OF THE DRAWINGS

The present disclosure will be understood and appreciated more fully from the following detailed description, taken in conjunction with the drawings in which:

FIG. 2b is a view of interleaved watermarking using a second protective feature constructed and operative in accordance with an embodiment of the present disclosure;

FIG. 2c is a view of interleaved watermarking using another protective feature constructed and operative in accordance with an embodiment of the present disclosure;

FIG. 4 is a view of an end-user device constructed and operative in accordance with an embodiment of the present disclosure.

DESCRIPTION OF EXAMPLE EMBODIMENTS

Overview

Figure 1:
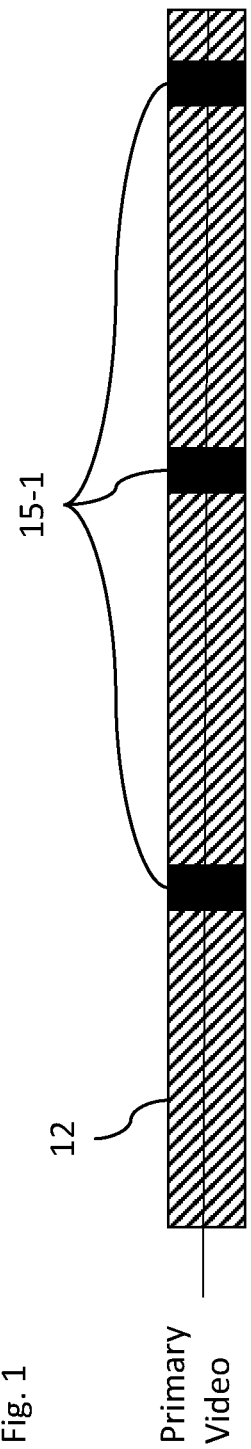
FIG. 1 is a view of interleaved watermarking using two variant series constructed and operative in accordance with an embodiment of the present disclosure.
Figure 1:
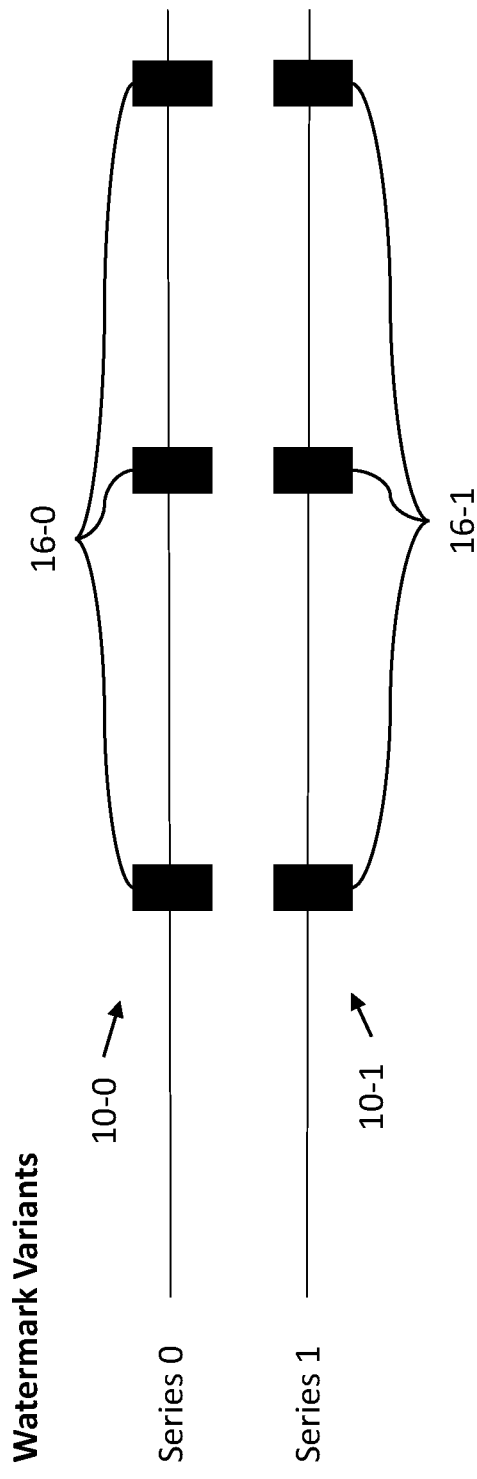

There is provided in accordance with an embodiment of the present disclosure, an apparatus including a processor to receive a primary video, select a plurality of first sections of the primary video in which to include units of data for use in watermarking, select a plurality of second sections of the primary video, each one of the plurality of second sections including a first data item without which at least one video unit of the primary video cannot be rendered or cannot be rendered correctly, replace each one first section of the plurality of first sections with at least two watermark variants, each one of the at least two watermark variants of the one first section including a watermarked version of the one first section, and replace each one second section of the plurality of second sections with at least two watermark variant decoys, each one of the at least two watermark variant decoys including the one second section, a memory to store data used by the processor, wherein, the apparatus is operative to operate in an environment including an end-user device operative to select one of the at least two watermark variants for each one of the plurality of first sections and one of the at least two watermark variant decoys for each one of the plurality of second sections for rendering as part of an interleaved video stream including the primary video in order to embed units of data of an identification in the interleaved video stream.

Encoded Versus Encrypted

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:

encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

DETAILED DESCRIPTION

Likewise, the terms "decoded" and "decompressed" on the one hand, and the terms "descrambled" and "decrypted" on the other hand, are used to refer to different and exclusive types of processing.

Reference is now made to FIG. 1, which is a view of interleaved watermarking using two variant series 10 (variant series 10-0 and variant series 10-1) constructed and operative in accordance with an embodiment of the present disclosure. It should be noted that unless otherwise mentioned, the various functions described with reference to FIGS. 1-2c are performed by a Headend or content provider or content supplier or content server or another server or processor located remotely to end-user devices. A plurality of sections 15-1 are selected from the primary video 12. Each section 15-1 is processed to: (i) include watermarking data in that section 15-1 yielding a watermark variant 16-0 for inclusion in the variant series 10-0; and (ii) include different watermarking data in that same section 15-1 yielding a watermark variant 16-1 for inclusion in the variant series 10-1. In an end-user device, the end-user device selects one of the watermark variants 16 for each of the sections 15-1 for rendering as part of an interleaved video stream including the primary video 12 in order to embed units of data of an identification in the interleaved video stream, as will be described in more detail below.

The sections 15-1 selected from the primary video 12, and included in the variant series 10 as the watermark variants 16, are removed from the primary video 12. The watermark variants 16 may be packaged in a transport stream with the same packet ID (PID) as the primary video 12. In such a case the different watermark variants 16 are signaled using suitable signals for example, but not limited to, using adaptation fields which are not typically encrypted. Alternatively, other timed metadata, for example, but not limited to, in a non-encrypted metadata stream, may be used to signal the watermark variants 16. Alternatively, the watermark variants 16 may be packaged in secondary video streams with different PIDs for each of the variant series 10-0 and 10-1. In such a case the primary video 12 also typically has a different PID from the variant series 10-0 and 10-1.

The primary video 12 is encrypted with an encryption key which may be changed periodically, e.g., per cryptoperiod. The variant series 10-0, "Series 0", is encrypted with an encryption key and the variant series 10-1, "Series 1", is encrypted with a different encryption key. The encryption keys used to encrypt the variant series 10 may be changed periodically, for example, but not limited to, every cryptoperiod or more or less frequently than every cryptoperiod described in more detail below. Each watermark variant 16 in each variant series 10 may be doubly encrypted, first with the encryption key designated for that variant series 10 and then with the encryption key used to encrypt the primary video 12 or alternatively first with the encryption key used to encrypt the primary video 12 and then with the encryption key designated for that variant series 10.

An end-user device receiving the primary video 12 and the two variant series 10 is provided with the decryption keys or information for generating the decryption keys to decrypt the primary video 12 and the variant series 10. The information for generating the decryption keys may be included in at least one entitlement control message (ECM) with the decryption keys being changed every cryptoperiod. Additionally or alternatively, decryption keys may be sent out-of-band from the transmission of the variant series 10 and the primary video 12 and the decryption keys may therefore by changed periodically and possibly out-of-sync with the cryptoperiods. The decryption keys may also be based on information stored in the end-user devices or using any other method known in the art for delivering decryption keys.

A processor such as a secure processor in the end-user device may be programmed with logic for deciding whether to generate the decryption key for decrypting the watermark variant 16-0 or the watermark variant 16-1 for each occurrence of the watermark variants 16. The logic may be based on which bit of an identification (ID) is to be embedded in the interleaved video stream. The knowledge of which bit needs to be embedded in the interleaved video stream may be included in the ECM(s) or in an index encoded in the primary video 12, by way of example only. The secure processor may also have access to the ID that needs to be embedded, for example, the ID may be embedded in the secure processor. So for example, if a current unit of data that should be embedded in the video rendered by the end-user device is a zero, the secure processor generates the decryption key for decrypting the watermark variant 16-0 of the variant series 10-0. On the other hand, if the current unit of data that should be embedded in the video rendered by the end-user device is a one, the secure processor generates the decryption key for decrypting the watermark variant 16-1 of the variant series 10-1. For each subsequent watermark variant pair 16-0, 16-1, the secure processor generates a decryption key so that selection of the watermark variant 16 for decrypting and rendering by the end-user device is performed based on the data which needs to be embedded in the resulting interleaved video stream for rendering by the end-user device.

Alternatively, the end-user device uses decryption keys which are delivered to the end-user device or are pre-stored on the end-user device, for example, by a manufacture. The decryption keys are stored on the device, securely if possible. The decryption keys may then be used to decrypt one of the watermark variants 16 for each occurrence of the watermark variants 16 (e.g., one watermark variant 16 is decrypted for each watermark variant pair 16). Typically one key is used for each occurrence of the watermark variants 16. So if there are 100 units of data in an ID for watermarking, the end-user device is provided with 100 keys selected from a possible 200 keys. Alternatively, the delivered or pre-stored keys may be combined with other key generation information, for example, delivered key generation information in order to generate decryption keys for decrypting one of the watermark variants 16 for each occurrence of the watermark variants 16. It will be appreciated that delivered decryption keys or the pre-stored decryption keys may include metadata which is used by the end-user device to match the correct decryption key with the correct watermark variant 16 and/or additional key generation information received by the end-user device.

The different watermark variants 16 decrypted and interleaved with the primary video 12 in the end-user devices then serve to uniquely identify each end-user device or subscriber, as the choice of which watermark variants 16 to decrypt and render is determined based on an ID associated with each respective end-user device or a subscriber or smart card, by way of example only. The embedded ID may be an identification of the end-user device or a subscriber or a smart card etc., or various encodings of the identification by various coding theory techniques such as error correcting codes and anti-collusion codes, by way of example.

It should be noted that using more than two variant series 10 may be implemented for use in watermarking. For example, using four variants series 10 may enable embedding two bits per watermark variant 16, e.g., each watermark variant 16 may embed either 00, 01, 10 or 11.

It will be appreciated that each unit of an ID may be repeated as necessary in the variant series 10 to make the resulting watermark robust enough, for example, but not limited to, for error correction purposes.

Figure 2A:
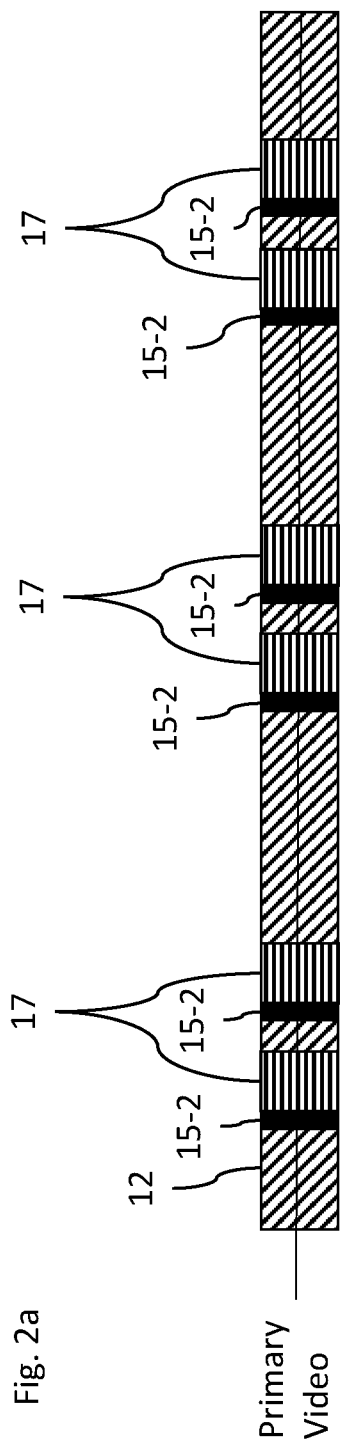
FIG. 2a is a view of interleaved watermarking using a first protective feature constructed and operative in accordance with an embodiment of the present disclosure.
Figure 2A:
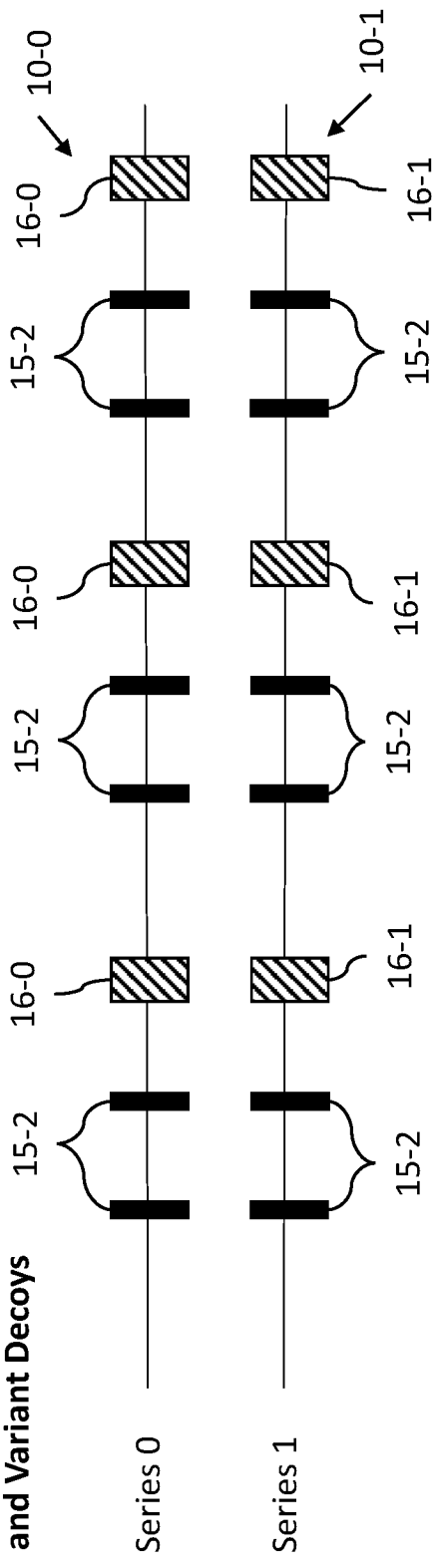

Reference is now made to FIG. 2a, which is a view of interleaved watermarking using a first protective feature constructed and operative in accordance with an embodiment of the present disclosure. One possible weakness in the watermarking scheme described above with reference to FIG. 1 is that an attacker trying to circumvent watermarking may decide to render the primary video 12 while filtering out the variant series 10. In real world settings, video decoders can compensate for missing or omitted macroblocks in the frames quite well and the degradation of the viewing experience may be minimal, while the watermark signal is completely destroyed. The above omission attack may be more impractical or even prevented if protection is implemented such that an attack by an attacker causes degraded video playback thus reducing the rendered video quality enough to discourage someone from viewing such a degraded video.

A set of critical video elements may be defined, and some or all sections, e.g., packets or slices, of the primary video 12 that include the critical video elements are moved from the primary video 12 to each of the variant series 10-0, 10-1 (in addition to generating the watermark variants 16 in the variant series 10). In such a way, an attacker filtering out the variant series 10 ends up filtering out the critical video elements as well as filtering out the watermark variants 16 and the decoder may not have enough data in the remaining primary video 12 to allow for any or almost any video playback or which negatively impacts the user viewing experience sufficiently.

The set of critical video elements may be defined to include, by way of example only, the network abstraction layer (NAL) headers for all (or some) NALs (or a subset thereof) in the Video Coding Layer (VCL), in other words the NAL headers for all (or some) slices (or a subset thereof). Alternatively or additionally, the set of critical video elements may be defined to include the NAL headers for all (or some) sequence parameter set (SPS) or the NAL headers for all (or some) picture parameter set (PPS) NALs (or a subset thereof), or all or some of the SPS NALs, or all or some of the PPS NALs, or all or some of the slice headers themselves, or some slice body packets or any combination of the above.

It should be noted that some sets of video elements may not be sufficient to prevent video playback. As an example, if only the NAL headers of I-slices were to be moved to the variant series 10 and then removed by an attacker, then the P and B-slice NAL headers are still parsed and consumed by the decoder, and even though P and B slices are inter-predicted, they contain enough intra-predicted macroblocks during scene changes that eventually, some quite reasonable video playback may take place.

The protective measure against the omission attack is now described in more detail. In addition to selecting the sections 15-1 (FIG. 1) from the primary video 12, a plurality of sections 15-2 are also selected from the primary video 12. Each section 15-2 includes a data item defined as a critical video element described above. The data item is used in rendering a part 17 (for example) of the primary video 12 such that the part 17 (e.g., at least one video unit, such as at least one frame or macroblock of video) cannot be rendered or cannot be rendered correctly without the data item.

The variant series 10 are generated to include the watermark variants 16 and the moved sections 15-2. For each of the sections 15-2, that section 15-2 is moved to each variant series 10. The sections 15-2 in the variant series 10 are also referred to as "watermark variant decoys" as they provide protection against an omission attack directed towards filtering out the watermark variants 16. Although the watermark variants 16 are different in each of the variant series 10, the sections 15-2 are generally identical in each of the variant series 10. When the variant series 10 are encrypted, an attacker will generally not be able to tell the sections 15-2 apart in the variant series 10. The sections 15-2 included in the variant series 10 typically do not include watermarking data.

The sections 15-1, 15-2 selected from the primary video 12 and included in some form in each variant series 10 are removed from the primary video 12. Nevertheless, the watermark variants 16 and the sections 15-2 may be packaged with the same packet ID (PID) as the primary video 12. Alternatively, the watermark variants 16 and the sections 15-2 may be packaged in secondary video streams with different PIDs for each variant series 10-0 and 10-1. In such a case, the primary video 12 also typically has a different PID from the variant series 10-0 and 10-1.

Reference is now made to FIG. 2b, which is a view of interleaved watermarking using a second protective feature constructed and operative in accordance with an embodiment of the present disclosure. The first protective feature, namely, adding the sections 15-2 (the "watermark variant decoys") to the variant series 10 may not be strong enough alone to prevent an attack as some statistical tests may be used by attackers to correctly tell apart the sections 15-2 from the watermark variants 16 in the variant series 10. In such a case, an attacker may simply filter out the watermark variants 16 and not the sections 15-2 from the variant series 10. An example of an attack is given below with reference to FIG. 2b and another example is given below with reference to FIG. 2c.

To try to mask statistical patterns that attackers may utilize, a statistical masking choice of additional sections 15-3, e.g., transport stream packets or slices, are selected from the primary video 12 and moved to each of the variant series 10 (in addition to the sections 15-2 and the watermark variants 16 included in the variant series 10). For each of the sections 15-3, that section 15-3 is moved to each variant series 10. The sections 15-3 when moved to each variant series 10 are also referred to as "statistical decoys". The statistical model driving the masking choice is typically based on the statistical patterns that attackers may use to tell apart the watermark variants 16 (e.g., watermarked packets or slices), from the sections 15-2 (e.g., critical video element packets), such that the masking choice masks the statistical pattern(s). It will be appreciated that the statistical masking may be applied in sections of the video that include watermark variants 16 and sections of video which do not include the watermark variants 16 do not necessarily need the statistical masking to be applied. It will be appreciated that the statistical masking choice depends on the statistical patterns that may be revealed by the sections 15-2 and the watermark variant 16 in the variant series 10. Two examples of statistical masking are described below, one with reference to FIG. 2b and one with reference to FIG. 2c.

The sections 15-3 may be randomly or pseudo-randomly selected from the primary video 12. In the example of FIG.

2*b*, the sections 15-3 are selected by randomly or pseudo-randomly selecting a plurality of locations in the primary video 12 from which to select the sections 15-3. The locations may be selected by applying a randomly or pseudo-randomly independent choice for each location, e.g., for each packet or slice in the primary video 12. By way of example, suppose that the watermark variants 16 and the sections 15-2 (e.g., critical video elements) individually fit within a single transport stream (TS) packet, and that watermarking data is included in one type of slice (for example B slices). Due to the different size distributions of I, P and B slices in normal H.264 video and the fact that some of the slice-types may not be used for watermarking, then the differences between the positions in which the packets in the variant series 10 appear in the whole TS might leak information about which packets include watermark data and which include critical video elements. By selecting the sections 15-3 from the primary video 12 for inclusion in the variant series 10 based on a Bernoulli random variable with a p parameter that is higher than the inverse of a small percentile of the distribution of distances between the positions of the packets in the variant series 10, the existing position differences are "broken" by the newly introduced TS packets that are interspersed among the existing TS packets of the variant series 10 and the pattern used by the attacker is lost. It will be appreciated that (pseudo-)random selection is not limited to Bernoulli choice and that any (pseudo-)random selection method may be used. By way of example and clarification, suppose that the distances between positions of the TS packets in the variant series 10 (both watermarking and critical video elements) is distributed with 10% percentile for inter-packet distance 200, 50% percentile (median) for inter-packet distance 450 and 90% percentile for inter-packet distance 1500. Then by making a Bernoulli choice for every TS packet in the primary video 12 with p equals $\frac{1}{180}$, on average every 180th TS packet from the primary video 12 is selected for inclusion in the variant series 10, and as a result the pattern of the differing gaps between the TS packets in the variant series 10 is masked.

The sections 15-1, 15-2, 15-3 selected from the primary video 12 and included in some form in the variant series 10 are removed from the primary video 12. Nevertheless, the watermark variants 16 and the sections 15-2, 15-3 may be packaged with the same packet ID (PID) as the primary video 12. Alternatively, the watermark variants 16 and the sections 15-2, 15-3 may be packaged in secondary video streams with different PIDs for each of the variant series 10-0 and 10-1. In such a case the primary video 12 also typically has a different PID from the variant series 10-0 and 10-1. It will be appreciated that any timecodes associated with the sections 15-1, 15-2, 15-3 in the primary video 12 are typically associated with the watermark variants 16 and the sections 15-2, 15-3 in the variant series 10.

Reference is now made to FIG. 2*c*, which is a view of interleaved watermarking using another protective feature constructed and operative in accordance with an embodiment of the present disclosure. FIG. 2*c* provides another example of masking a statistical model by selecting the sections 15-3 from the primary video 12 in a random or pseudo-random way. In contrast to FIG. 2*b*, where the locations of the sections 15-3 are selected randomly or pseudo-randomly, in FIG. 2*c*, a length of each section 15-3 is selected randomly or pseudo-randomly as will now be described in more detail. A length for each section 15-3 is selected randomly or pseudo-randomly. Additionally, the location of each section 15-3 in the primary video stream 14 may be selected to be adjoining one of the sections 15-2 so that each section 15-2 has an adjoining section 15-3 in each variant series 10 or the location of each section 15-3 in the primary video stream 14 may be selected randomly or pseudo-randomly. The above may be illustrated by way of example. Suppose that the statistical pattern used by attackers to distinguish between the watermark variants 16 and sections 15-2 (e.g., watermark variant decoys) is based on the lengths of the watermark variants 16 and the sections 15-2. For example, the sections 15-2 may have a length of 1, whereas the watermark variants 16 may have a length that is Poisson distributed with lambda equal to 6. Then to thwart an attack, the sections 15-3 may be chosen randomly or pseudo-randomly with a length distribution of lambda equal to 5 and added immediately after or before the sections 15-2 (e.g., the watermark variant decoys), thereby masking out the pattern that was used by attackers to distinguish the watermark variants 16 from the sections 15-2. It should be noted that more than one masking method may be applied to the variant series 10.

Figure 3:
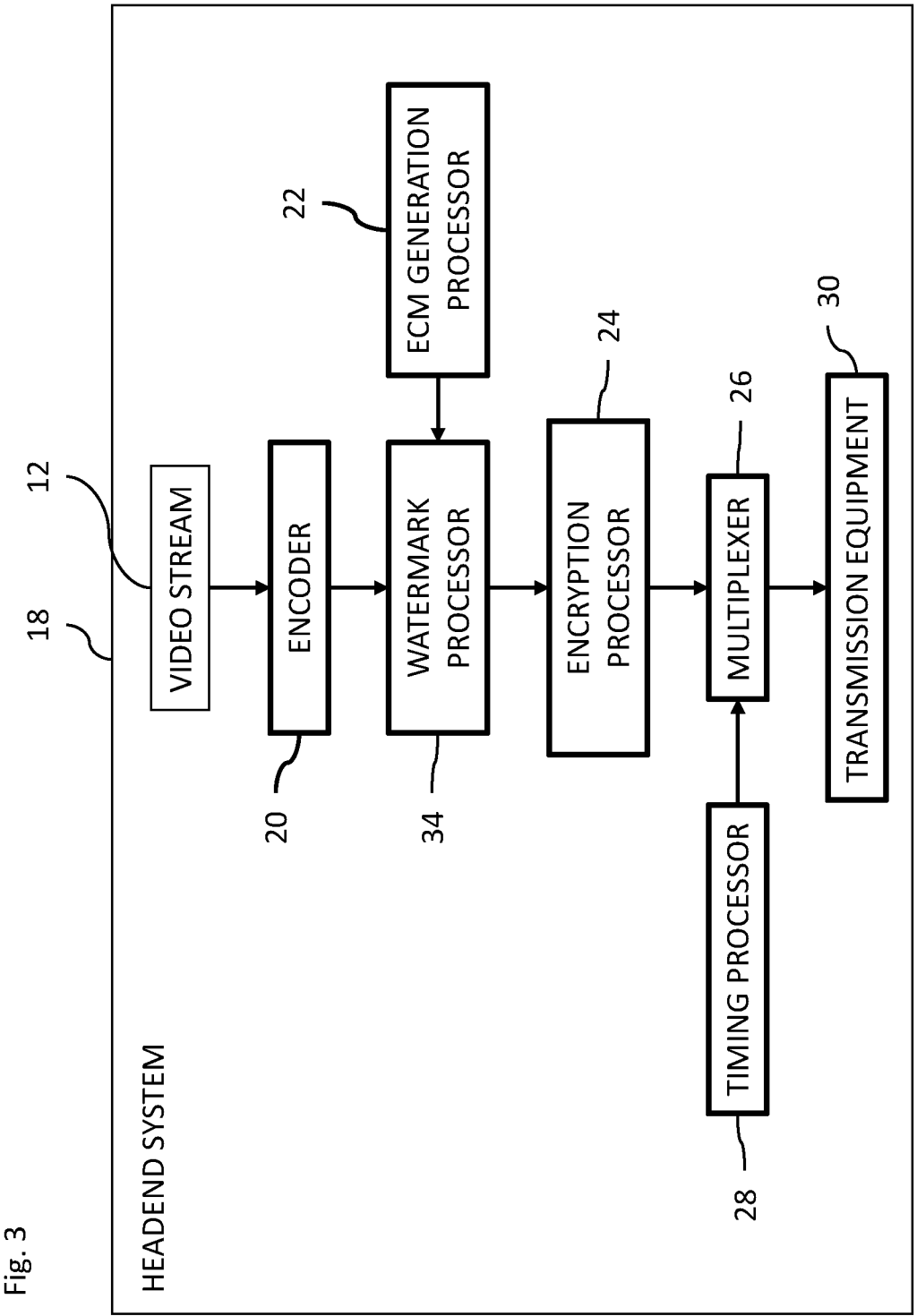
FIG. 3 is a view of a headend system constructed and operative in accordance with an embodiment of the present disclosure.

Reference is now made to FIG. 3, which is a view of a broadcast headend system 18 constructed and operative in accordance with an embodiment of the present disclosure. Throughout the description below reference is also made to: the variant series 10, primary video 12 and the watermark variants 16 of FIGS. 1 and 2*a-c*; the sections 15-1 of FIG. 1; the sections 15-2 of FIGS. 2*a-c*; the parts 17 of FIG. 2*a*; and the sections 15-3 of FIGS. 2*b-c*.

The headend 18 includes an encoder 20, a watermark processor 34, an ECM generation processor 22, an encryption processor 24, a multiplexer 26, a timing processor 28 and transmission equipment 30. The elements 20, 22, 24, 26, 28, 30, 34 may be combined together in any suitable combination implemented as one or more processors.

The headend 18 is described by way of example only. It will be appreciated that the primary video 12 and the variant series 10 may be generated in any suitable processing device or devices, for example, but not limited to a content server or content processor and transmitted to end-user devices using any suitable medium, for example, but not limited to, satellite, cable, internet protocol (IP), cellular, local network and/or wireless network, by any suitable method, for example, but not limited to broadcast, multi-cast, unicast, VOD etc. Alternatively, the primary video 12 and the variant series 10 may be prepared for disposing on a non-transient medium such as a compact disk (CD) or digital video disk (DVD), by way of example only.

The encoder 20 is operative to receive and encode the primary video 12. The watermark processor 34 is operative to receive the encoded primary video 12 from the encoder 20. The watermark processor 34 is operative to select the sections 15-1 of the primary video 12 in which to include units of data for use in watermarking. The watermark processor 34 is operative to select the sections 15-2 of the primary video 12. Each section 15-2 includes a data item without which at least one video unit of the primary video 12 cannot be rendered or cannot be rendered correctly. The data item is selected from one of the following: a network abstraction layer (NAL) header; a slice header; and a slice body packet, by way of example only. Optionally, the watermark processor 34 is operative to randomly or pseudo-randomly select the sections 15-3 of the primary video 12. The watermark processor 34 may be operative to randomly or pseudo-randomly select locations in the primary video 12 from which to select the sections 15-3. Additionally or alternatively, the watermark processor 34 is operative, for each section 15-3, to randomly or pseudo randomly select a length for that section 15-3.

The watermark processor 34 is operative to replace each section 15-1 with at least two watermark variants 16 such that for each section 15-1, each watermark variant 16 of that section 15-1 includes a watermarked version of that section 15-1. The different watermarks variants 16 of the same section 15-1 include different watermarking data. The watermark processor 34 is operative to replace each section 15-2 with at least two watermark variant decoys such that for each section 15-2, each watermark variant decoy includes that section 15-2, but does not include watermarking data. The watermark processor 34 is operative to replace each section 15-3 with at least two statistical decoys such that for each section 15-3, each statistical decoy includes that section 15-3, but does not include watermarking data. The watermark variants 16, the watermark variant decoys and the statistical decoys form part of the variant series 10 as described above with reference to FIGS. 2a-c.

The variant series 10 may be generated as secondary streams with different PIDs from the PID of the primary video 12 or with the same PID as the primary video 12 with signaling, as discussed above, for signaling the data of each variant series 10. The replaced sections 15-1, 15-2, 15-3 are removed from the primary video 12 even though the sections 15-2, 15-3 and the watermark variants 16 may have the same PID as the primary video 12 in certain embodiments. It should be noted that replacing each section 15-1, 15-2, 15-3 of the primary video 12 with two (or more) other sections 15-1, 15-2, 15-3, as described above, may be achieved by duplicating each section 15-1, 15-2, 15-3 once (or more if there a three or more variant series 10) (with changes for watermarking as necessary for the sections 15-1) and moving the original section 15-1, 15-2, 15-3 (with changes for watermarking as necessary for the sections 15-1) from the primary video 12 to the variant series 10.

The encryption processor 24 is operative to: encrypt each watermark variant 16 of a same section 15-1 with a different encryption key; encrypt each watermark variant decoy of a same section 15-2 with a different encryption key; and each statistical decoy of a same section 15-3 with a different encryption key. It should be noted that one or more watermark variants 16 and/or watermark variant decoy(s) and/or statistical decoy(s) of the same variant series 10 (e.g., variant series 10-0 or variant series 10-1) may share the same encryption key. The encryption processor 24 is operative to encrypt the encoded and amended primary video 12 with its encryption key. The encrypted variant series 10 may also be encrypted again with the encryption key used to encrypt the encoded and amended primary video 12. Alternatively, the variant series 10 may be first encrypted with the encryption key used to encrypt the encoded and amended primary video 12 and then with the encryption keys of the variant series 10. The encryption processor 24 may be operative to change the different encryption keys periodically. If ECMs are being used for decryption purposes, the ECM generation processor 22 is operative to generate one or more entitlement control messages for each cryptoperiod.

If the variant series 10 do not have the same PID as the primary video 12 it may be necessary to arrange the placement of the packets of the variant series 10 among the packets of the primary video 12 in a transport stream in the same order that the sections 15-1, 15-2, 15-3 were included in the primary video 12 before the sections 15-1, 15-2, 15-3 were removed from the primary video 12. In such a case, the timing processor 28 may be operative to arrange the packets of the variant series 10 among the variant series 10 according to timecodes or timestamps associated with the packets in the series 10 and the primary video 12. The multiplexer 26 is operative to multiplex the variant series 10 in the transport stream with the primary video 12. The transmission equipment 30 is operative to transmit the transport stream to end-user devices. It should be noted that for the sake of simplicity, the terms primary video 12 and variant series 10 is used in the specification and claims to refer to a non-encoded version or an encoded version but not encrypted version or an encoded and encrypted version or any other version of the primary video 12 and the variant series 10.

Reference is now made to FIG. 4, which is a view of an end-user device 38 constructed and operative in accordance with an embodiment of the present disclosure. The end-user device 38 includes a receiver 40, a demultiplexer 42, a decryption processor 44 and a decoder 46. The receiver 40 is operative to receive a transport stream 48 including the encrypted and encoded variant series 10 and the encrypted and encoded primary video 12. By way of introduction, the end-user device 38 selects one of the watermark variants 16 for each section 15-1 and one of the watermark variant decoys for each section 15-2 and one of the statistical decoys for each section 15-3 (if included) for rendering as part of an interleaved video stream including the primary video 12 in order to embed units of data of an identification in the interleaved video stream. The end-user device 38 is now described in more detail.

The demultiplexer 42 is operative to demultiplex the variant series 10 and the primary video 12 included in the transport stream 48. The decryption processor 44 is operative to: receive decryption keys and/or decryption key generation information and/or one or more ECMs periodically, for example, for each cryptoperiod. A secure processor (for example, in a smart card 50 or in the end-user device 38) may be operative to generate the decryption keys and/or select the decryption keys that were delivered to, or pre-stored on, the end-user device 38.

If the decryption keys for the variant series 10 are generated in the end-user device 38, the secure processor may be programmed with the logic for deciding which decryption keys to generate. The logic is typically based on which bit of the ID needs to be embedded corresponding to one of the variant series 10. The knowledge of which bit needs to be embedded may be included in the ECM(s) or in an index encoded in the primary video 12, or the ID may be embedded in the secure processor, by way of example only.

The decryption processor 44 is operative to decrypt the encrypted and encoded primary video 12 and the relevant parts of the relevant encrypted and encoded variant series 10 using the generated and/or delivered and/or pre-stored decryption keys. The decoder 46 is operative to decode the decrypted primary video 12 and the decrypted selected variant series 10. The decoder 46 is generally operative to reassemble the decoded primary video 12 and the decoded selected variant series 10 in the order in which the primary video 12 and the variant series 10 were disposed in the transport stream 48 as an interleaved video stream.

In practice, some or all of these functions, including the functions of the watermark processor 34, may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. An apparatus comprising:
 a memory device; and
 a processor coupled to the memory device, wherein the processor is operative to:
  receive a primary video;
  select a plurality of first sections of the primary video in which to include units of data for use in watermarking;
  select a plurality of second sections of the primary video, each one of the plurality of second sections including a first data item without which at least one video unit of the primary video cannot be rendered or cannot be rendered correctly;
  replace each one first section of the plurality of first sections with at least two watermark variants, each one of the at least two watermark variants of the one first section including a watermarked version of the one first section;
  replace each one second section of the plurality of second sections with at least two watermark variant decoys, each one of the at least two watermark variant decoys including the one second section; and
  select one of the at least two watermark variants for each one of the plurality of first sections and one of the at least two watermark variant decoys for each one of the plurality of second sections for rendering as part of an interleaved video stream including the primary video in order to embed units of data of an identification in the interleaved video stream, wherein each one of the at least two watermark variant decoys of each one of the plurality of second sections does not include watermarking data.

2. The apparatus according to claim 1, wherein each one of the plurality of second sections includes a first data item without which at least one video unit of the primary video cannot be rendered.

3. The apparatus according to claim 1, wherein each one of the plurality of second sections includes a first data item without which at least one video unit of the primary video cannot be rendered correctly.

4. The apparatus according to claim 1, wherein the processor is further operative to:
 encrypt each one of the at least two watermark variants of a same one of the plurality of first sections with a different encryption key; and
 encrypt each one of the at least two watermark variant decoys of a same one of the plurality of second sections with a different encryption key.

5. The apparatus according to claim 1, wherein the first data item is selected from one of the following: a network abstraction layer (NAL) header; a slice header; and a slice body packet.

6. The apparatus according to claim 1, wherein the processor is further operative to:
 randomly or pseudo-randomly select a plurality of third sections of the primary video; and
 replace each one third section of the plurality of third sections with at least two statistical decoys, each one of the at least two statistical decoys including the one third section.

7. The apparatus according to claim 6, wherein each one of the at least two statistical decoys of each one of the plurality of third sections does not include watermarking data.

8. The apparatus according to claim 6, wherein the processor is operative to randomly or pseudo-randomly select a plurality of locations in the primary video from which to select the plurality of third sections.

9. The apparatus according to claim 6, wherein the processor is operative to, for each one third section of the plurality of third sections, randomly or pseudo randomly select a length for the one third section.

10. A method comprising:
 receiving a primary video;
 selecting a plurality of first sections of the primary video in which to include units of data for use in watermarking;
 selecting a plurality of second sections of the primary video, each one of the plurality of second sections including a first data item without which at least one video unit of the primary video cannot be rendered or cannot be rendered correctly;
 replacing each one first section of the plurality of first sections with at least two watermark variants, each one of the at least two watermark variants of the one first section including a watermarked version of the one first section; and
 replacing each one second section of the plurality of second sections with at least two watermark variant decoys, each one of the at least two watermark variant decoys including the one second section, wherein each one of the at least two watermark variant decoys of each one of the plurality of second sections does not include watermarking data.

11. The method according to claim 10, wherein each one of the plurality of second sections includes a first data item without which at least one video unit of the primary video cannot be rendered.

12. The method according to claim 10, wherein each one of the plurality of second sections includes a first data item without which at least one video unit of the primary video cannot be rendered correctly.

13. The method according to claim 10, further comprising:
 encrypting each one of the at least two watermark variants of a same one of the plurality of first sections with a different encryption key; and encrypting each one of the at least two watermark variant decoys of a same one of the plurality of second sections with a different encryption key.

14. The method according to claim 10, wherein the first data item is selected from one of the following: a network abstraction layer (NAL) header; a slice header; and a slice body packet.

15. The method according to claim 10, further comprising:
randomly or pseudo-randomly selecting a plurality of third sections of the primary video; and
replacing each one third section of the plurality of third sections with at least two statistical decoys, each one of the at least two statistical decoys including the one third section.

16. The method according to claim 15, wherein each one of the at least two statistical decoys of each one of the plurality of third sections does not include watermarking data.

17. The method according to claim 15, further comprising randomly or pseudo-randomly selecting a plurality of locations in the primary video from which to select the plurality of third sections.

18. The method according to claim 15, further comprising, for each one third section of the plurality of third sections, randomly or pseudo randomly selecting a length for the one third section.

19. A non-transitory computer readable medium comprising instructions which when executed perform a method comprising:
receiving a primary video;
selecting a plurality of first sections of the primary video in which to include units of data for use in watermarking;
selecting a plurality of second sections of the primary video, each one of the plurality of second sections including a first data item without which at least one video unit of the primary video cannot be rendered or cannot be rendered correctly;
replacing each one first section of the plurality of first sections with at least two watermark variants, each one of the at least two watermark variants of the one first section including a watermarked version of the one first section;
replacing each one second section of the plurality of second sections with at least two watermark variant decoys, each one of the at least two watermark variant decoys including the one second section; and
selecting one of the at least two watermark variants for each one of the plurality of first sections and one of the at least two watermark variant decoys for each one of the plurality of second sections for rendering as part of an interleaved video stream including the primary video in order to embed units of data of an identification in the interleaved video stream, wherein each one of the at least two watermark variant decoys of each one of the plurality of second sections does not include watermarking data.

20. The non-transitory computer readable medium according to claim 19, wherein the instructions which when executed perform the method further comprising:
encrypting each one of the at least two watermark variants of a same one of the plurality of first sections with a different encryption key; and
encrypting each one of the at least two watermark variant decoys of a same one of the plurality of second sections with a different encryption key.

* * * * *